United States Patent
Kinomura (10) Patent No.: US 11,424,699 B2
(45) Date of Patent: Aug. 23, 2022

(54) ELECTRIC MOTOR CONTROL DEVICE, COMPRESSOR, AND ELECTRIC MOTOR CONTROL METHOD

(71) Applicant: Kabushiki Kaisha Yaskawa Denki, Kitakyushu (JP)

(72) Inventor: Hirofumi Kinomura, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 67 days.

(21) Appl. No.: 16/587,075

(22) Filed: Sep. 30, 2019

(65) Prior Publication Data

US 2020/0028454 A1 Jan. 23, 2020

Related U.S. Application Data

(63) Continuation of application No. PCT/JP2017/013801, filed on Mar. 31, 2017.

(51) Int. Cl.
*H02P 21/14* (2016.01)
*H02P 6/10* (2006.01)
(Continued)

(52) U.S. Cl.
CPC ............ *H02P 6/10* (2013.01); *H02P 21/22* (2016.02); *H02P 29/40* (2016.02); *H02P 29/50* (2016.02); *H02P 21/26* (2016.02)

(58) Field of Classification Search
CPC ........ H02P 2006/045; H02P 6/06; H02P 6/08; H02P 21/22; H02P 23/04; H02P 29/40;
(Continued)

(56) References Cited

U.S. PATENT DOCUMENTS 4,622,500 A 11/1986 Budelman, Jr.
2008/0297095 A1 12/2008 Aono et al.
(Continued)

FOREIGN PATENT DOCUMENTS

CN 101686020 A 3/2010
CN 102821505 A 12/2012
(Continued)

OTHER PUBLICATIONS

Search Report dated Jan. 31, 2020, for corresponding EP Patent Application No. 17903113.3.
(Continued)

*Primary Examiner* — Muhammad S Islam
*Assistant Examiner* — Zemenay T Truneh
(74) *Attorney, Agent, or Firm* — HEA Law PLLC (57) ABSTRACT

Provided is an electric motor control apparatus (1) configured to extract a speed ripple component from a difference between an angular frequency command and an angular frequency feedback, configured to generate a phase of the speed ripple component from the speed ripple component, configured to multiply a value of a periodic function corresponding to the phase and a given amplitude by each other, to thereby generate a torque compensation value, configured to calculate a torque command value from the difference between the angular frequency command and the angular frequency feedback, and configured to control a current to be output to an electric motor based on a compensated torque command obtained by adding the torque compensation value to the torque command value.

10 Claims, 7 Drawing Sheets

(51) Int. Cl.
*H02P 21/22* (2016.01)
*H02P 29/40* (2016.01)
*H02P 29/50* (2016.01)
*H02P 21/26* (2016.01)

(58) Field of Classification Search
CPC .... H02P 29/50; H02P 6/10; H02P 6/28; H02P 21/26
See application file for complete search history.

(56) References Cited

U.S. PATENT DOCUMENTS

| | | |
|---|---|---|
| 2010/0308757 A1 | 12/2010 | Ide et al. |
| 2012/0268046 A1* | 10/2012 | Yamazaki ............... H02P 21/26 318/400.02 |
| 2014/0265962 A1 | 9/2014 | Gebregergis et al. |
| 2015/0333670 A1 | 11/2015 | Nakajima et al. |
| 2017/0302201 A1* | 10/2017 | Saito .................. H02P 6/10 |

FOREIGN PATENT DOCUMENTS

| | | |
|---|---|---|
| EP | 1519046 A2 | 3/2005 |
| EP | 3098449 A1 | 11/2016 |
| JP | 2002-247878 A | 8/2002 |
| JP | 2010-288440 A | 12/2010 |
| JP | 2012-100510 A | 5/2012 |
| JP | 2012-110111 A | 6/2012 |
| JP | 2014-150604 A | 8/2014 |
| JP | 5914777 B2 | 5/2016 |

OTHER PUBLICATIONS

English translate for the International Search Report for PCT/JP2017/013801 dated Jun. 20, 2017.

* cited by examiner

ELECTRIC MOTOR CONTROL DEVICE, COMPRESSOR, AND ELECTRIC MOTOR CONTROL METHOD

INCORPORATION BY REFERENCE

The present disclosure contains subject matter related to that disclosed in International Patent Application under the PCT/JP2017/013801 filed in the Japan Patent Office on Mar. 31, 2017, the entire contents of which are hereby incorporated by reference.

BACKGROUND OF THE INVENTION

Field of the Invention

The present invention relates to an electric motor control apparatus, a compressor, and an electric motor control method.

Description of the Related Art

When a speed of an electric motor is controlled through use of an electric motor control apparatus, for example, an inverter, and the electric motor is used for an application in which a load periodically fluctuates, for example, a compressor, speed fluctuation periodically occurs in the electric motor as the load fluctuates, which causes vibration and noise.

In JP 2002-247878 A, there is described a control method for an electric motor, which involves obtaining a compensation voltage pattern in accordance with fluctuation of a load torque for each of predetermined rotation angles of an electric motor, storing the obtained compensation voltage patterns in an internal memory of the control means, and setting a value obtained by adding addition data read out from the internal memory at each of the predetermined rotation angles to a reference voltage as a voltage to be applied to an electric motor so as to change an output torque of the electric motor, to thereby suppress the fluctuation in the rotation speed in one rotation.

In JP 5914777 B2, there is described an automatic correction method for a torque of a compressor, which involves using the phase locked loop (PLL) to generate a torque correction angle from a target speed and a feedback speed, generating a torque correction range value from an additional torque reference value, and generating a feedforward torque correction value from the target speed, the torque correction angle, and the torque correction range value.

SUMMARY OF THE INVENTION

According to one embodiment of the present invention, there is provided an electric motor control apparatus including: a speed ripple component extraction unit configured to extract a speed ripple component from a difference between a command angular frequency and a speed feedback angular frequency; a phase locked loop circuit configured to generate a phase of the speed ripple component from the speed ripple component; a torque compensation value generation unit configured to multiply a value of a periodic function corresponding to the phase and a given amplitude by each other, to thereby generate a torque compensation value; a speed control unit configured to calculate a torque command value from the difference between the command angular frequency and the speed feedback angular frequency; and a current control unit configured to control a current to be output to an electric motor based on a compensated torque command obtained by adding the torque compensation value to the torque command value.

According to still another embodiment of the present invention, there is provided an electric motor control method including: extracting a speed ripple component from a difference between an angular frequency command and an angular frequency feedback; generating a phase of the speed ripple component from the speed ripple component; multiplying a value of a periodic function corresponding to the phase and a given amplitude by each other, to thereby generate a torque compensation value; calculating a torque command value from the difference between the angular frequency command and the angular frequency feedback; obtaining a compensated torque command by adding the torque compensation value to the torque command value; and controlling a current to be output to an electric motor based on the compensated torque command.

DESCRIPTION OF THE EMBODIMENTS

Figure 1:
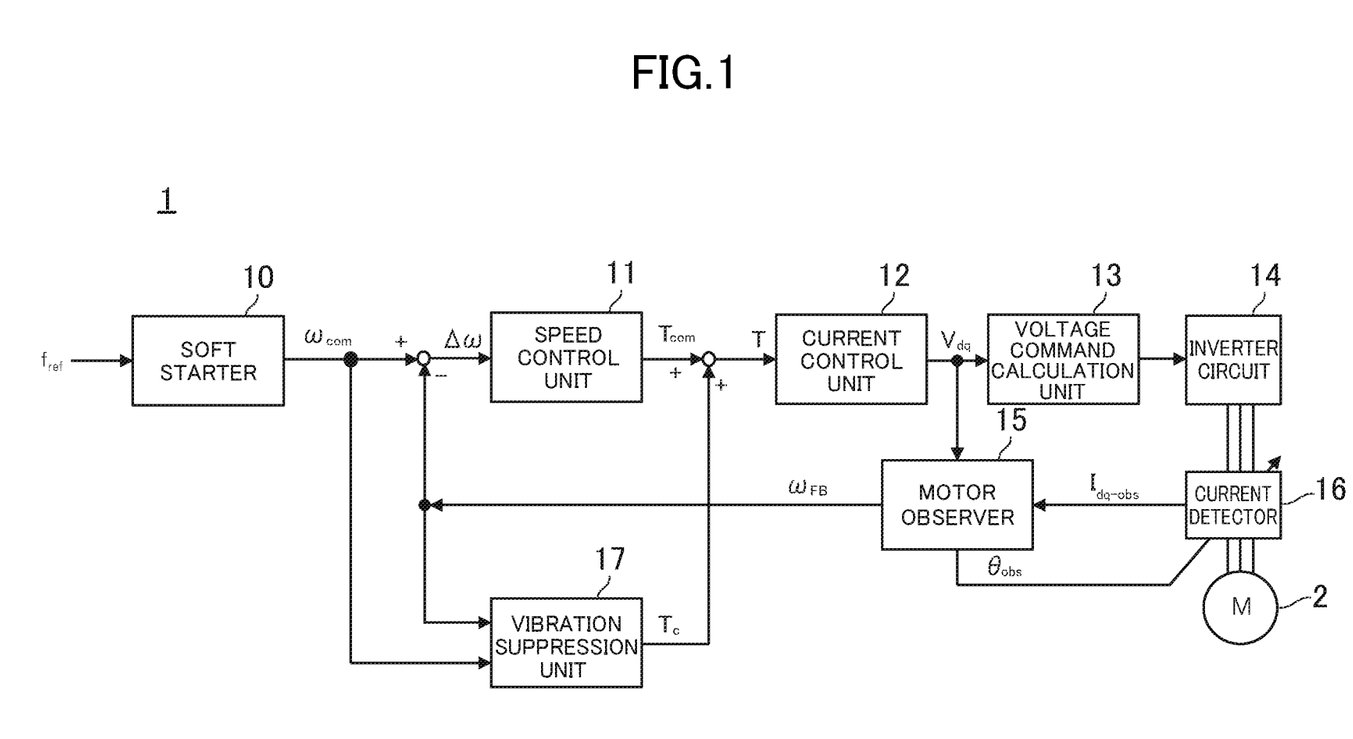
FIG. 1 is a block diagram for illustrating a configuration of an electric motor control apparatus according to an embodiment of the present invention.

FIG. 1 is a block diagram for illustrating a configuration of an electric motor control apparatus 1 according to an embodiment of the present invention.

The electric motor control apparatus 1 is an apparatus configured to supply electric power so that an electric motor 2 rotates at a predetermined speed, based on an input frequency command $f_{ref}$. The electric motor control apparatus 1 is a so-called inverter control apparatus (simply also referred to as "inverter"), but is not limited to the inverter control apparatus, and may be a control apparatus such as a servo control apparatus or a cycloconverter. The electric motor 2 is an AC electric motor, but the type of the electric motor 2 is not particularly limited, and may be one of various types of induction machines or synchronous machines. In this configuration, the electric motor 2 is, as an example, a three-phase permanent magnet synchronous electric motor. Arbitrary load (not shown) is connected to the electric motor 2. The load is not particularly limited, but a compressor is exemplified in this case as a mechanism having large torque fluctuation in one rotation of the electric motor 2.

<Electric Motor Control Apparatus>

As illustrated in FIG. 1, the electric motor control apparatus 1 includes, as a basic configuration, a soft starter 10, a speed control unit 11, a current control unit 12, a voltage command calculation unit 13, an inverter circuit 14, a motor observer 15, a current detector 16, and a vibration suppression unit 17. The soft starter 10 is configured to gradually increase a command angular frequency $\omega_{com}$ so as to accelerate the electric motor 2 up to a predetermined speed while avoiding an overload when the electric motor 2 is started. The frequency $\omega_{com}$ matches $2\pi f_{ref}$ after a sufficient period elapses. A speed feedback angular frequency $\omega_{FB}$ is subtracted from the command angular frequency $\omega_{com}$ so that so-called speed feedback is constructed. A difference angular frequency $\Delta\omega$ is input to the speed control unit 11.

The speed control unit 11 is also referred to as "speed controller", and is configured to output a command torque $T_{com}$ based on the difference angular frequency $\Delta\omega$. A torque compensation value $T_c$ is added to the command torque $T_{com}$ so as to execute vibration suppression. A compensated command torque T (corresponding to a compensated torque command) is input to the current control unit 12.

The current control unit 12 is also referred to as "current controller", is configured to output a command value to the inverter circuit 14 so that the electric motor 2 outputs a desired torque, based on the compensated command torque T. In this case, the inverter circuit 14 is of the voltage type, and thus outputs a voltage command $V_{dq}$ on a d-q plane. For example, PWM modulation is further applied to the voltage command $V_{dq}$ by the voltage command calculation unit 13, and the modulated voltage command $V_{dq}$ is applied to the inverter circuit 14. When the inverter circuit 14 is of the current type, the output from the current control unit 12 may be a current command. In such a case, a current command calculation unit may be provided in place of the voltage command calculation unit 13.

The motor observer 15 is configured to obtain an estimated mechanical position $\theta_{obs}$ of the electric motor and a speed feedback angular frequency $\omega_{FB}$, which is an estimated angular frequency of the electric motor, based on the voltage command $V_{dq}$ from the current control unit 12 and a current value $I_{dq\text{-}obs}$ detected from the current detector 16 provided between the inverter circuit 14 and the electric motor 2. The estimated mechanical position $\theta_{obs}$ is used by the current detector 16 so as to obtain the current value $I_{dq\text{-}obs}$, which is a current value on the d-q plane. However, this configuration is not always required, and the current value $I_{dq\text{-}obs}$ is only required to be obtained in accordance with types of the current detector 16 and the electric motor 2.

The vibration suppression unit 17 is configured to output the torque compensation value $T_c$ to be added to the command torque $T_{com}$ in order to suppress the vibration of the electric motor. The vibration suppression unit 17 uses the difference between the command angular frequency $\omega_{com}$ and the speed feedback angular frequency $\omega_{FB}$, and thus inputs the command angular frequency $\omega_{com}$ and the speed feedback angular frequency $\omega_{FB}$ in this case, but a magnitude (amplitude) of the value of the torque compensation value $T_c$, which is the output value, and a magnitude of the value of the difference between the command angular frequency $\omega_{com}$ and the speed feedback angular frequency $\omega_{FB}$ do not directly relate to each other, and the vibration suppression unit 17 does not thus form a so-called feedback loop. Therefore, the addition of the torque compensation value $T_c$ to the command torque $T_{com}$ can be considered as feedforward compensation.

In the above-mentioned configuration of the electric motor control apparatus 1, the current control unit 12 and the vibration suppression unit 17 are described in detail later.

The remaining configuration, that is, the soft starter 10, the speed control unit 11, the voltage command calculation unit 13, the motor observer 15, and the current detector 16 may employ any publicly-known structure, and details thereof are not a technical subject matter of the present invention, and hence a detailed description thereof is thus omitted.

Further, the motor observer 15 and the current detector 16 may have any configurations as long as the speed feedback angular frequency $\omega_{FB}$ is obtained. In place of the configuration formed of the motor observer 15 and the current detector 16, a sensor configured to continuously detect the mechanical position of the electric motor 2, such as a rotary encoder or a resolver, may be provided, or there may be provided a publicly known configuration of providing a sensor configured to partially detect the mechanical position for the electric motor 2, for example, a Hall element, to estimate the mechanical position. However, as illustrated in FIG. 1, the configuration formed of the motor observer 15 and the current detector 16 does not require the provision of a special sensor for the electric motor 2, and the cost and the size of the control system for the electric motor 2 including the electric motor control apparatus 1 can be reduced.

<Current Control Unit>

Figure 2:
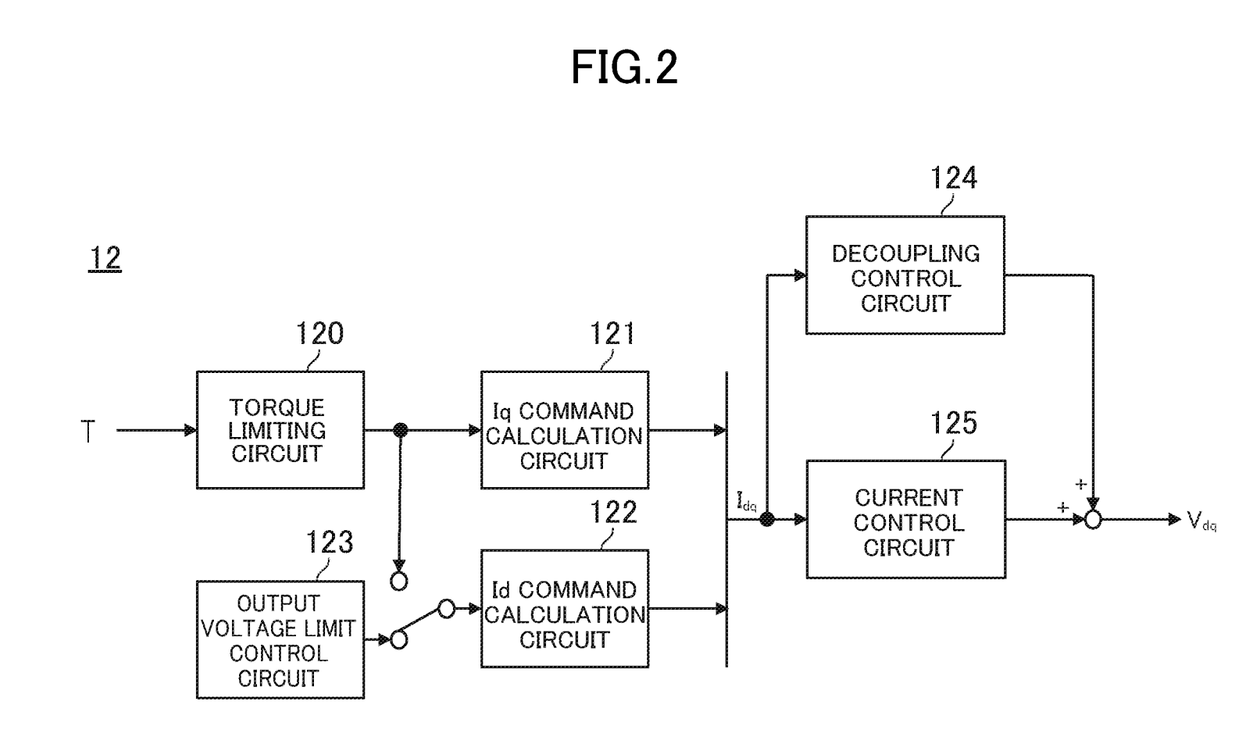
FIG. 2 is a diagram for illustrating a more detailed configuration of a current control unit.

FIG. 2 is a diagram for illustrating a more detailed configuration of the current control unit 12. As illustrated in FIG. 2, the current control unit 12 includes, for example, a torque limit circuit 120, an Iq command calculation circuit 121, an Id command calculation circuit 122, an output voltage limiting control circuit 123, a decoupling control circuit 124, and a current control circuit 125. The configuration of the current control unit 12 is publicly known, and is not special.

The compensated command torque T input to the current control unit 12 has an upper limit limited by the torque limiting circuit 120 so as not to be an excessive torque command, and is then converted to the current value $I_{dq}$ on the d-q plane by the $I_q$ command calculation circuit 121 and the $I_d$ command calculation circuit 122. The voltage that can be output by the inverter circuit 14 is limited, and hence in this example, the output voltage limit control circuit 123 is switched to the torque limiting circuit 120 to be connected to the $I_d$ command calculation circuit 122 as required so that the d component of the current value $I_{dq}$ can be limited.

In this example, the inverter circuit 14 is of the voltage type, and hence the current value Idq is converted to a voltage value by the current control circuit 125, and undergoes decoupling by the decoupling control circuit 124. Then, the voltage command $V_{dq}$ is obtained. None of the torque control circuit 120, the output voltage limiting control circuit 123, and the decoupling control circuit 124 is indispensable in this configuration, and is an optional configuration. Moreover, it is only required to appropriately employ a publicly-know configuration as each of the functions forming the current control unit 12, and hence a detailed description each thereof is omitted.

<Amplitude Suppression Unit>

Figure 3:
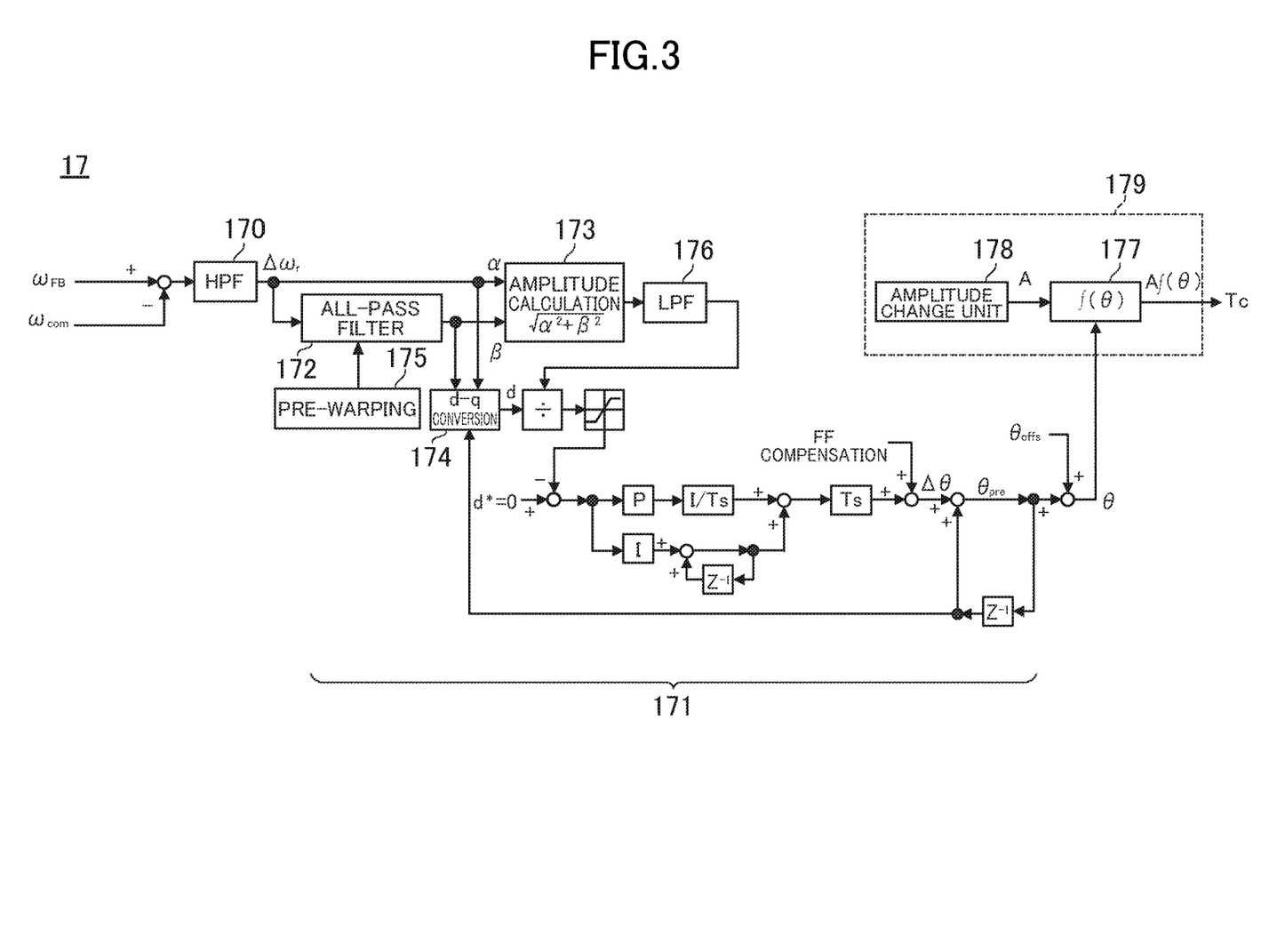
FIG. 3 is a diagram for illustrating a more detailed configuration of a vibration suppression unit.

FIG. 3 is a diagram for illustrating a more detailed configuration of the vibration suppression unit 17. As illustrated in FIG. 3, the vibration suppression unit 17 includes a high-pass filter 170, a phase locked loop circuit 171, and a torque compensation value generation unit 179. The torque compensation value generation unit 179 includes a frequency function calculation unit 177 and an amplitude change unit 178.

The vibration suppression unit 17 is configured to remove a DC component from the difference between the speed feedback angular frequency $\omega_{FB}$ and the command angular frequency $\omega_{com}$ by the high-pass filter 170, to thereby extract a speed ripple component $\Delta\omega_r$, which is an AC component. The high-pass filter 170 is a configuration as an example of a speed ripple component extraction unit configured to extract the speed ripple component from the difference between the speed feedback angular frequency $\omega_{FB}$ and the command angular frequency $\omega_{com}$.

A specific configuration of the speed ripple component extraction unit is not limited to the high-pass filter 170 described herein. For example, the configuration may be such that an average value of the input signal is measured online, and the measured value may be subtracted from the input signal. In this case, it is considered that the average value of the input signal measured online corresponds to the DC component. Alternatively, the configuration may be such that frequency transform, for example, fast Fourier transform (FFT), is applied to the input signal to remove a low-frequency component (this is considered as the DC component), and then, the inverse transform is applied. There is no problem even when still another configuration is employed.

The vibration suppression unit 17 is configured to synchronize a phase $\theta$ of the speed ripple component $\Delta\omega_r$ by the phase locked loop circuit 171, to thereby extract the phase $\theta$ from the speed ripple component $\Delta\omega_r$. A configuration of the phase locked loop circuit 171 is not necessarily limited, and a publicly-known configuration may appropriately be employed. In this example, first, the speed ripple component $\Delta\omega_r$ itself is set as an $\alpha$ phase, and a component whose phase is shifted by 90 degrees by causing the speed ripple component $\Delta\omega_r$ to pass through an all-pass filter 172 is set as a $\beta$ phase. An amplitude of the speed ripple component $\Delta\omega_r$ is obtained from the $\alpha$ phase and the $\beta$ phase by amplitude calculation 173, and coordinate conversion is executed by d-q conversion 174, to thereby apply coordinate conversion from an $\alpha$-$\beta$ plane to the d-q plane to the speed ripple component $\Delta\omega_r$.

The phase is shifted by 90 degrees by the all-pass filter 172 in order to execute the d-q conversion thereafter, to thereby synchronize the phase $\theta$. This synchronization calculation is described later. Moreover, compensation may be applied by pre-warping 175 to the all-pass filter 172 so as to compensate for a phase shift caused by discretization. Moreover, noise caused by discretization and the like may be removed by the low-pass filter 176 from the amplitude obtained by the amplitude calculation 173.

PI control of the d-axis component obtained by the d-q conversion 174 is executed by inputting the value 0 as a target command d* for the d-axis component. Integration is executed by adding a phase difference $\Delta\theta$ of the speed ripple component consequently obtained to a phase difference $\Delta\theta$ for the next calculation through a delay element $Z^{-1}$, to thereby obtain a pre-offset phase $\theta_{pre}$. Simultaneously, the pre-offset phase $\theta_{pre}$ is input to the d-q conversion 174, and is used for coordinate transformation in the d-q conversion. That is, this configuration is to obtain the pre-offset phase $\theta_{pre}$ so that the d-axis component obtained by the d-q conversion 174 becomes 0. In other words, the d-axis component is constrained so as to be 0 at the time of the d-q conversion, to thereby obtain the pre-offset phase $\theta_{pre}$.

This pre-offset phase $\theta_{pre}$ approximately represents the phase of the speed ripple component $\Delta\omega_r$. In this manner, the phase of the speed ripple component $\Delta\omega_r$ can be obtained even without detecting the mechanical position of the electric motor 2 by calculating the pre-offset phase $\theta_{pre}$ through the d-q conversion of the speed ripple component $\Delta\omega_r$ ($\alpha$ phase) and the component obtained by shifting the phase of the speed ripple component $\Delta\omega_r$ by 90° ($\beta$ phase).

The obtained pre-offset phase $\theta_{pre}$ is a phase of the speed ripple component $\Delta\omega_r$ with respect to the speed itself. The phase $\theta$ useful for the torque compensation can thus be obtained by adding an offset value $\theta_{offs}$. The offset value $\theta_{offs}$ is a phase difference of the torque with respect to the speed and is thus approximately 90 degrees, but more or less fluctuates due to an inertial mass of the electric motor 2 and a load. The offset value $\theta_{offs}$ is therefore given in advance as a given specified value.

The obtained phase $\theta$ is converted to a value corresponding to a phase of a given function by the periodic function calculation unit 177. The periodic function calculation unit 177 uses any function $f(\theta)$ having a period of $2\pi$ as the given function in this case, and any periodic function in accordance with a waveform of speed vibration occurring in the electric motor 2 may be prepared. In this example, the speed vibration used for the electric motor 2 is almost approximated by a sinusoidal wave, and the periodic function calculation unit 177 uses a sinusoidal function.

Moreover, an amplitude A (corresponding to a given amplitude) is given by the amplitude change unit 178 to the periodic function calculation unit 177, and is multiplied. $Af(\theta)$ obtained in such a manner becomes the torque compensation value $T_c$, and is added to the command torque $T_{com}$, and the compensated command torque T is consequently calculated. Thus, the periodic function calculation unit 177 and the amplitude change unit 178 form the torque compensation value generation unit 179 configured to multiply the value $f(\theta)$ corresponding to the phase $\theta$ of the periodic function f by the given amplitude A, to thereby generate the torque compensation value $T_c$.

The amplitude A output from the amplitude change unit 178 may be given as a constant fixed value, or may be changed in accordance with various conditions. A description is now given of control for the amplitude A output by the amplitude change unit 178.

<Operation of Vibration Suppression>

Figure 4:
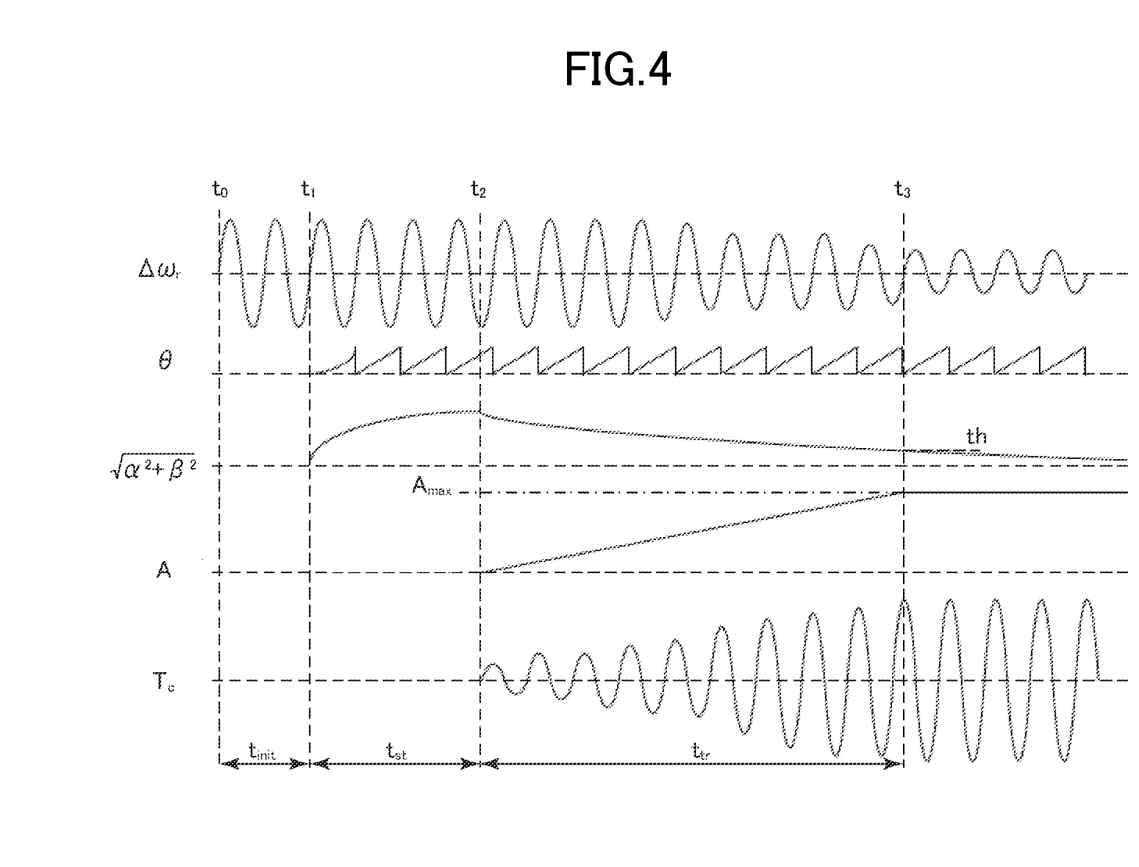
FIG. 4 is a waveform diagram for showing an operation of vibration suppression by the vibration suppression unit.

FIG. 4 is a waveform diagram for showing the operation for the vibration suppression by the vibration suppression unit 17.

In FIG. 4, the time is assigned to the horizontal axis, and the speed ripple component $\Delta\omega_r$, the phase $\theta$, the amplitude of the speed ripple component obtained by the amplitude calculation 173, the amplitude A output from the amplitude change unit 178, and the torque compensation value $T_c$ are illustrated in the stated order from the top row.

First, a period from a start of the electric motor 2 to its speed settlement is illustrated in a section from a time point $t_0$ to a time point $t_1$. Even when the compensation for the vibration suppression is executed, a deviation in speed occurs until the speed of the electric motor 2 is settled. Therefore, the vibration cannot always be suppressed, and the vibration may be amplified instead in some cases. Thus, the vibration suppression is not executed originally. In this example, this section is a section in which the operation of the vibration suppression unit 17 itself is stopped, and no operation is executed. A time period $t_{init}$, in which the electric motor 2 started at the time point $t_0$ is settled at the time point $t_1$, may appropriately be defined. The time period $t_{init}$ is approximately several seconds to several tens of seconds, which depends on a magnitude of the load, and may be several minutes particularly in a case of a large machine.

Moreover, a section from a start of the vibration suppression unit 17 itself to settlement of the phase locked loop circuit is illustrated in a section from the time point $t_1$ to a time point $t_2$. In this section, the value of θ and the value of the amplitude of the speed ripple component are not settled as shown in FIG. 4 until the value of Δθ obtained by the d-q conversion 174 illustrated in FIG. 3 is settled. Even when the compensation for the vibration suppression is executed in this section, the value of θ is not always accurate. Thus, there is a fear that the vibration may not sufficiently be suppressed, or may be amplified. In view of this, the amplitude change unit 178 sets the amplitude A to 0 or a sufficiently small value, and maintains the torque compensation value $T_c$ to 0 or approximately 0 so as not to practically execute the vibration suppression in this section. A time period $t_{st}$ from the time point $t_1$ to the time point $t_2$ may also appropriately be defined, and is approximately 1 to several seconds.

Further, a section from a time point $t_2$ to a time point $t_3$ is a section in which the vibration suppression is being executed by the vibration suppression unit 17. In this section, the phase locked loop circuit is stable, and the amplitude θ is correctly obtained. The amplitude change unit 178 gradually increases the value of the amplitude A in this state. Accordingly, the amplitude of the torque compensation value $T_c$ also gradually increases. This process is performed in order to avoid a mechanical shock by not abruptly, but gradually changing a behavior of the electric motor 2. The maximum value $A_{max}$ of the value of the amplitude A may be given in advance. Moreover, a change period $t_{tr}$ of the amplitude A may also be freely set. The change period $t_{tr}$ may approximately be several seconds to several tens of seconds. Further, a pattern of increasing the amplitude A is linear in this embodiment as shown in FIG. 4, but the amplitude A may be increased along any curve.

Finally, a section after the time point $t_3$ is a section in which the vibration suppress ion is stably executed by the vibration suppression unit 17. In this section, the quantities shown in FIG. 4 do not present large changes, and both of the speed ripple component $\Delta\omega_r$ and the amplitude of the speed ripple component obtained by the amplitude calculation 173 are suppressed so as to be small, and thus it is found that the vibration of the electric motor 2 is suppressed.

<Vibration Suppression Operation at the Time when Amplitude Changes>

Figure 5:
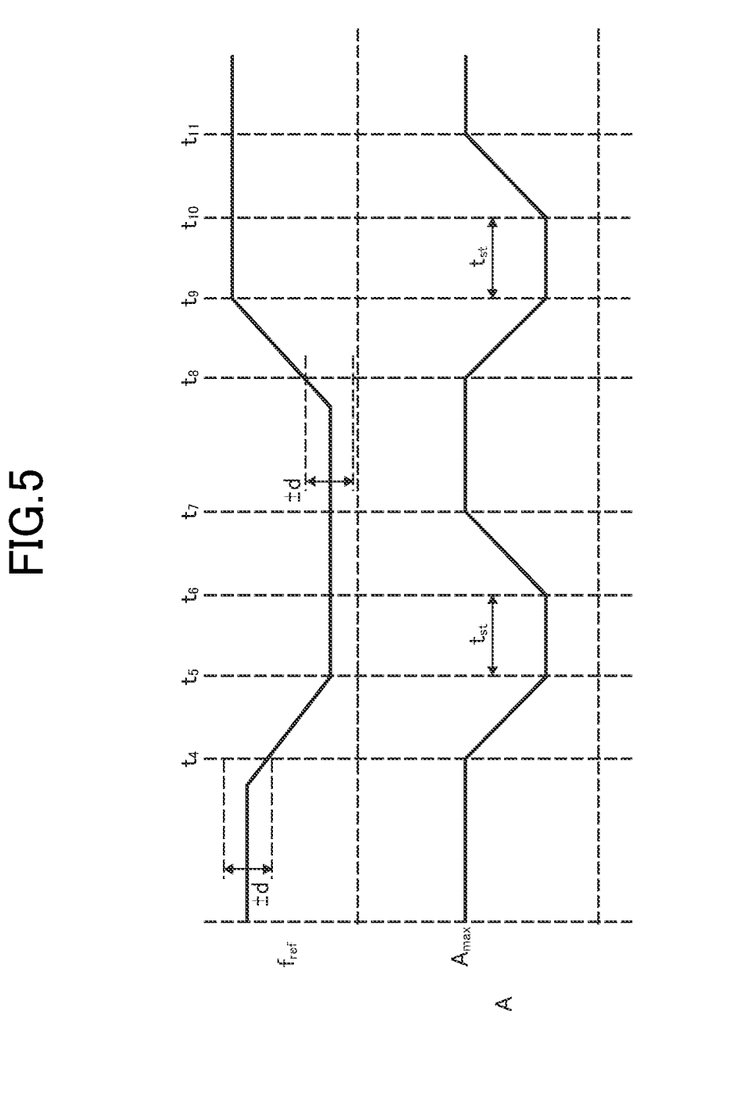
FIG. 5 is a waveform diagram for showing an operation of the vibration suppression to be performed by an amplitude change unit when a frequency command is used as a speed of an electric motor.

Further, the amplitude change unit 178 may change the amplitude A in accordance with the speed of the electric motor 2. FIG. 5 is a waveform diagram for showing an operation of the vibration suppression by the amplitude change unit 178 when the frequency command $f_{ref}$ is used as the speed of the electric motor 2. It is assumed that the speed of the electric motor 2 follows the frequency command $f_{ref}$ without delay, and the frequency $f_{ref}$ is thus used, but the same result is obtained even when the angular frequency feedback $\omega_{FB}$ is used in place thereof. Alternatively, the angular frequency command $\omega_{com}$ may be used.

In the example shown in FIG. 5, a case in which the frequency command $f_{ref}$ changes during the operation is illustrated. In the first state (before a time point $t_4$) shown in FIG. 5, the frequency command $f_{ref}$ is maintained so as to be a relatively high value, and the amplitude A is also the maximum value $A_{max}$. Thereafter, when the frequency command $f_{ref}$ starts decreasing, and the change in the speed of the electric motor 2 is detected, the amplitude change unit 178 gradually reduces the amplitude A. In this detection, an occurrence of a change is detected when the speed of the electric motor 2 deviates from a certain range around the detected stable value. More specifically, as shown in FIG. 5, the speed change is detected at the time point $t_4$, at which the frequency command $f_{ref}$ departs from a range ±d around the stable value, and the amplitude A is gradually reduced.

Meanwhile, when the speed of the electric motor 2 does not change for a certain period of time, the speed of the electric motor 2 is detected as being settled. In this case, the amplitude change unit 178 gradually increases the amplitude A this time. In FIG. 5, at a time point $t_5$, the value of the frequency command $f_{ref}$ no longer changes, and is settled. In this example, after $t_5$, the time period $t_{st}$ of the section from the time point $t_1$ to the time point $t_2$ of FIG. 4 is applied as the certain period. This is the period until the value of Δθ obtained by the d-q conversion 174 is settled as described above, and is thus required for stable vibration suppression. Then, the amplitude change unit 178 gradually increases the amplitude A from a time point $t_6$, at which this time period $t_{st}$ has elapsed.

The same applies to a case in which the value of the frequency command $f_{ref}$ increases. A speed change in the electric motor 2 is detected at a time point $t_8$, and the amplitude A is also reduced. The change in the value of the frequency command $f_{ref}$ stops at a time point $t_9$, and the amplitude A is again increased from a time point $t_{10}$ after the time period $t_{st}$ has elapsed to a time point $t_{11}$, to thereby execute the amplitude suppression.

This operation of the amplitude change unit 178 is basically such that when the speed of the electric motor 2 is changing, the vibration suppress ion is not always effective and the vibration suppression is thus not executed, and the vibration suppression is executed when the speed of the electric motor 2 is settled and does not change. Moreover, whether the vibration suppression is executed or not is not rapidly switched, but the amplitude A is gradually changed so as to gently switch on/off of the vibration suppression, to thereby avoid the mechanical shock.

Further, the amplitude change unit 178 may determine the amplitude A in accordance with an amplitude of the speed feedback. Referring again to FIG. 4, the maximum value $A_{max}$ of the amplitude A may be given in advance in the above description. However, when the $A_{max}$ is determined by a user, or is determined at the time of the manufacture of a device (for example, a compressor) for which the electric motor 2 is used, a test run adjustment through measurement are required. Moreover, when the load fluctuates or a secular change occurs, the value of $A_{max}$ initially given may not always be optimal. Further, when the value of $A_{max}$ is insufficient, the vibration suppression is not sufficiently executed. Meanwhile, when the value of $A_{max}$ is too large, the vibration is not only suppressed, but a vibration in an opposite direction is also promoted instead.

Thus, the amplitude change unit 178 may compare the vibration amplitude of the speed feedback and a threshold value th with each other. Then, the amplitude change unit 178 may stop the increase in the amplitude A at a time point at which the vibration amplitude goes sufficiently below the threshold value th and the vibration is determined to be sufficiently suppressed, and may use such a value as the value of the amplitude A. In FIG. 4, the amplitude of the speed ripple component obtained by the amplitude calculation 173 can be used as the vibration amplitude of the speed feedback. The increase in the value of the amplitude A may be stopped when this value falls below the threshold value th indicated as the reference regardless of $A_{max}$, and the value at this time point may be determined as the value of the amplitude A. Time and effort to determine the value of $A_{max}$ in advance can be reduced by this configuration, and an appropriate value of the amplitude A can automatically be obtained even when the load fluctuates or a secular change occurs.

<Operation Flow>

Figure 6:
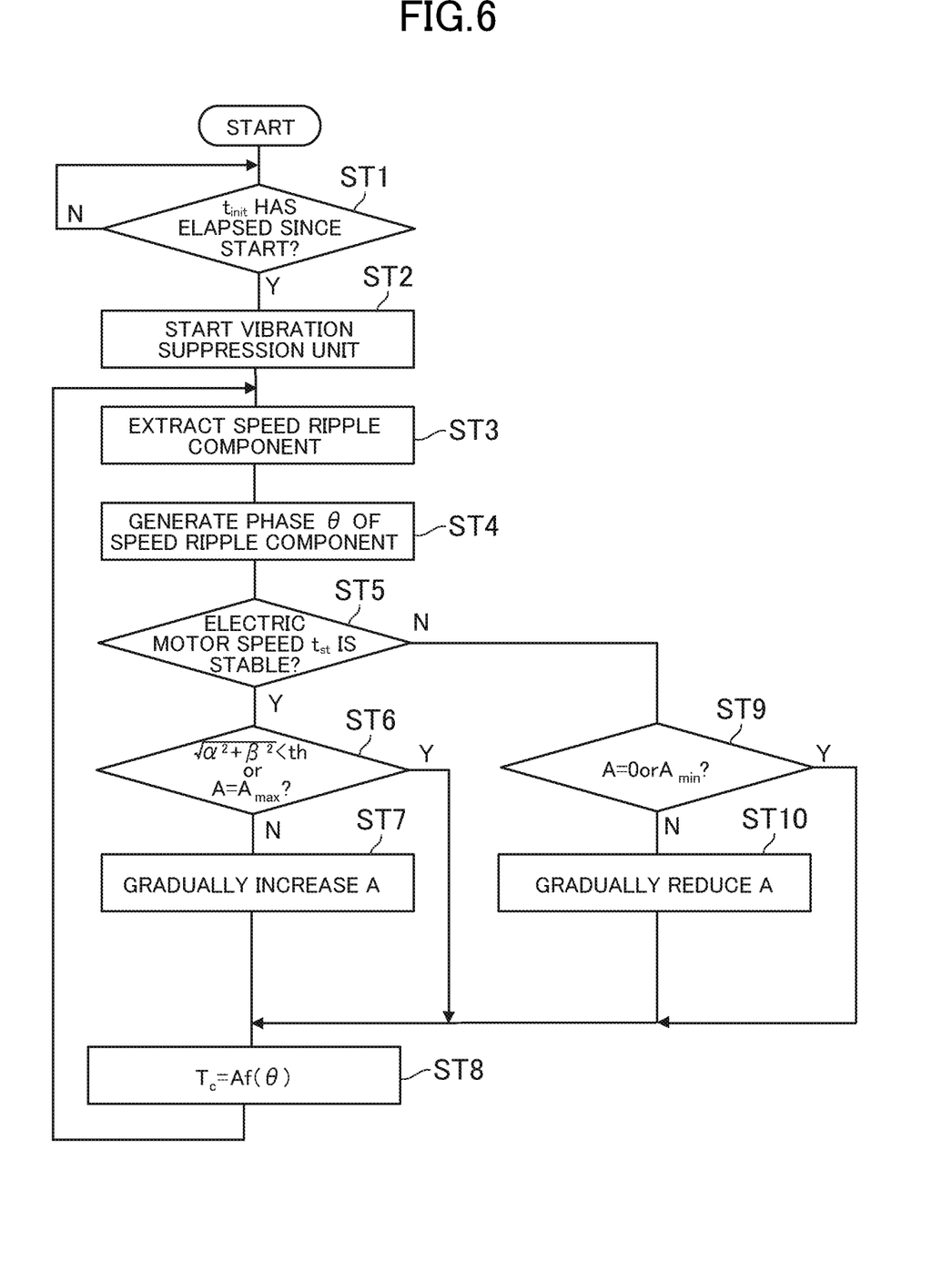
FIG. 6 is a flowchart for illustrating an operation of the vibration suppression unit.

FIG. 6 is a flowchart for illustrating an operation of the vibration suppression unit 17. First, the vibration suppression unit 17 is not started in an initial state, and it is determined whether or not the time period $t_{init}$ has elapsed after the start of the electric motor 2 (Step ST1). When the time period $t_{init}$ has not elapsed (N in Step ST1) the processing waits until the time period $t_{init}$ elapses so that the speed of the electric motor 2 is settled. When the time period $t_{init}$ has elapsed (Y in Step ST1), the vibration suppression unit 17 is started (Step ST2).

When the vibration suppression unit 17 is started, the vibration suppression unit 17 extracts the speed ripple component $\Delta\omega$ from the difference between the angular frequency command $\omega_{com}$ and the angular frequency feedback $\omega_{FB}$ (Step ST3). Further, the phase θ is generated from the speed ripple component $\Delta\omega$ by the phase locked loop circuit 171 (Step ST4). In this case, as already described, the phase θ is generated from the speed ripple component $\Delta\omega$ and the component obtained by shifting the phase of the speed ripple component $\Delta\omega$ by 90 degrees through use of the d-q conversion.

Then, the vibration suppression unit 17 determines whether or not the speed of the electric motor is continuously settled for the time period $t_{st}$ (Step ST5). This determination may be made based on whether the speed of the electric motor deviates from the predetermined range (±d) around the stable speed of the electric motor. Moreover, as the speed of the electric motor, any of the frequency command $f_{ref}$, the angular frequency feedback $\omega_{FB}$, and the angular frequency command $\omega_{com}$ may be used.

When the speed of the electric motor is continuously settled for the time period $t_{st}$ (Y in Step ST5), it is determined whether the vibration amplitude of the speed feedback is less than the threshold value th and the vibration suppression has already sufficiently been executed, or the amplitude A has reached the maximum value $A_{max}$ (Step ST6). When the vibration amplitude of the speed feedback is not less than the threshold value th and the amplitude A has not reached the maximum value $A_{max}$ (N in Step ST6), the amplitude change unit 178 gradually increases the value of the amplitude A (Step ST7). Then, the torque compensation value $T_c$ is obtained as Af(θ) through use of the obtained amplitude A and the periodic function f(θ), the torque compensation is executed, and the vibration suppression is executed (Step ST8).

When the vibration amplitude of the speed feedback is less than the threshold value th or the amplitude A has reached its maximum value $A_{max}$ (Y in Step ST6), the amplitude A is not required to be increased. Thus, the processing proceeds to Step ST8 without changing the value of the amplitude A, and the vibration suppression is executed.

Meanwhile, when the speed of the electric motor is not continuously settled for the time period $t_{st}$ (N in Step ST5), that is, when the speed of the electric motor has changed or the time period $t_{st}$ has not elapsed after the speed of the electric motor was settled, it is determined whether or not the amplitude A is already 0 or has reached the minimum value $A_{min}$ of the amplitude A (Step ST9). The minimum value $A_{min}$ of the amplitude A is not always required to be set in this case, and may be set to 0.

When the amplitude A is not 0 and the amplitude A has not reached the minimum value $A_{min}$ of the amplitude A (N in Step ST9), the amplitude change unit 178 gradually reduces the amplitude A (Step ST10). Then, the processing proceeds to Step ST8, and the vibration suppression is executed.

When the amplitude A is 0 or the amplitude A has reached the minimum value $A_{min}$ of the amplitude A (Y in Step ST9), the processing immediately proceeds to Step ST8, and the vibration suppression is executed without changing the amplitude A. When the amplitude A is 0 in this case, the vibration suppression is not executed at all.

When the vibration suppression is executed (Step ST8), the processing again returns to Step ST3, and the vibration suppression is executed while the electric motor 2 is rotating. As a result, with the flow illustrated in FIG. 6, even when the speed of the electric motor 2 changes during the operation, the vibration suppression is not executed during while the speed is changing. While the speed is settled, the vibration suppression can be executed, and a transition between those two cases can be smoothed, to thereby reduce a shock and the like to the mechanism. Moreover, the value of the amplitude A is automatically adjusted to a value with which the vibration suppression is sufficiently executed.

In the above description, the command angular frequency $\omega_{com}$ and the speed feedback angular frequency $\omega_{FB}$ are each independently input to the vibration suppression unit 17, and the speed ripple component $\Delta\omega_r$ is obtained based on the difference therebetween in the vibration suppression unit 17, but the speed ripple component $\Delta\omega_r$ may directly be input to the vibration suppression unit 17 depending on the configuration of the electric motor control apparatus 1. In the example illustrated in FIG. 1, a value obtained by inverting the sign of the difference angular frequency $\Delta\omega$ is equal to the speed ripple component $\Delta\omega_r$, and hence the difference angular frequency $\Delta\omega$ or the value obtained by inverting the sign thereof may directly be input to the vibration suppression unit 17. Alternatively, as the configuration of the electric motor control apparatus 1, when the configuration includes, for example, a speed compensator and a phase compensator in order to add robustness, the speed ripple component $\Delta\omega_r$ may be used, and hence the speed ripple component $\Delta\omega_r$ may directly be input to the vibration suppression unit 17.

<Example of Effects>

As described above, with the electric motor control apparatus 1 according to this embodiment, the phase θ of the speed ripple component $\Delta\omega_r$ is generated by the phase locked loop circuit 171 after the speed ripple component $\Delta\omega_r$ is extracted, and the torque compensation value $T_c$ is generated from the phase θ, thereby being able to compensate for the torque command $T_{com}$. Thus, the speed fluctuation of the electric motor 2 can be suppressed in accordance with the phase of the actual speed fluctuation occurring in the electric motor 2. Accordingly, the speed fluctuation of the electric motor 2 can be suppressed without requirement of measurement of the mechanical angle of the electric motor 2 and obviously without requirement of a map of a correction amount corresponding to the mechanical angle. Further, a calculation delay of the torque compensation value $T_c$ can be suppressed by generating the torque compensation value $T_c$ after the phase θ of the speed ripple component $\Delta\omega_r$ is once generated, and the effect of suppressing the speed fluctuation can thus be increased. Further, the calculation of the torque compensation value $T_c$ is executed independently of the speed control unit 11, and the torque compensation value $T_c$ can be fed forward. Thus, even when the torque command $T_{com}$, which is the output of the speed control unit 11, changes rapidly, the calculation of the torque compensation value $T_c$ is not influenced, and the suppression of the speed fluctuation can be continued.

Moreover, with the electric motor control apparatus 1, the phase locked loop circuit 171 generates the phase θ through the d-q conversion from the speed ripple component $\Delta\omega_r$ and the component obtained by shifting the phase of the speed ripple component $\Delta\omega_r$ by 90°. Thus, it is not required to measure the mechanical angle also in this generation of the phase θ, and hence processing that generates a delay, for example, a low-pass filter, can be minimized. Moreover, the phase θ is generated through the d-q conversion without using the input frequency command $f_{ref}$ in the generation of the phase θ, and the torque compensation value $T_c$ can independently be calculated even when the command torque $T_{com}$ is not stable.

Moreover, with the electric motor control apparatus 1, the phase θ can be generated in consideration of the offset value $\theta_{off}$ defined in advance in the phase locked loop circuit 171. Thus, the effect of suppressing the speed fluctuation can quickly and reliably be provided by setting delays in, for example, the inertial mass, the load, the PI loop and the low-pass filter 176 as the offset value $\theta_{off}$ in advance.

Further, with the electric motor control apparatus 1, the amplitude A of the torque compensation value $T_c$ to be used by the periodic function calculation unit 177 is set by the amplitude change unit 178, and hence it is not required to set, for example, machine specifications of the electric motor 2 or the like and accompanying parameters thereof, in advance. Moreover, the amplitude change unit 178 changes the amplitude A, to thereby be able to suppress the speed fluctuation without a rapid change in speed.

On this occasion, the amplitude A can gradually be increased by the amplitude change unit 178 after the speed of the electric motor 2 is settled. Therefore, the speed fluctuation can be suppressed while preventing a malfunction caused by the start of the suppression of the speed fluctuation during the speed change of the electric motor 2 such as acceleration, for example, such a defect that the speed change is amplified instead.

Moreover, the amplitude change unit 178 can determine the amplitude A in accordance with the amplitude of the speed feedback. In this case, the speed fluctuation can more effectively be suppressed by automatically generating the amplitude A in accordance with the magnitude of the speed fluctuation (for example, the magnitude of the vibration). Further, the amplitude change unit 178 can also gradually reduce the amplitude A when the speed of the electric motor 2 changes. In this case, the rapid change in speed can be suppressed when, for example, the function of suppressing the speed fluctuation is turned off.

The configurations of the embodiments above are described as specific examples, and are not intended to limit the invention disclosed herein to the configurations of those specific examples themselves. Various modifications may be made to the disclosed embodiments. Further the control illustrated in the flowcharts may also be appropriately replaced by other control having the same functions. It is to be understood that the technical scope of the invention disclosed herein cover all such modifications.

Moreover, apart of the series of procedures of processing described in the above-mentioned embodiments may be executed by dedicated hardware, but may be executed by software. When the series of procedures of processing is executed by software, the electric motor control apparatus includes a general-purpose or dedicated computer, and at least apart of the series of procedures of processing can be implemented by the computer executing a program.

Figure 7:
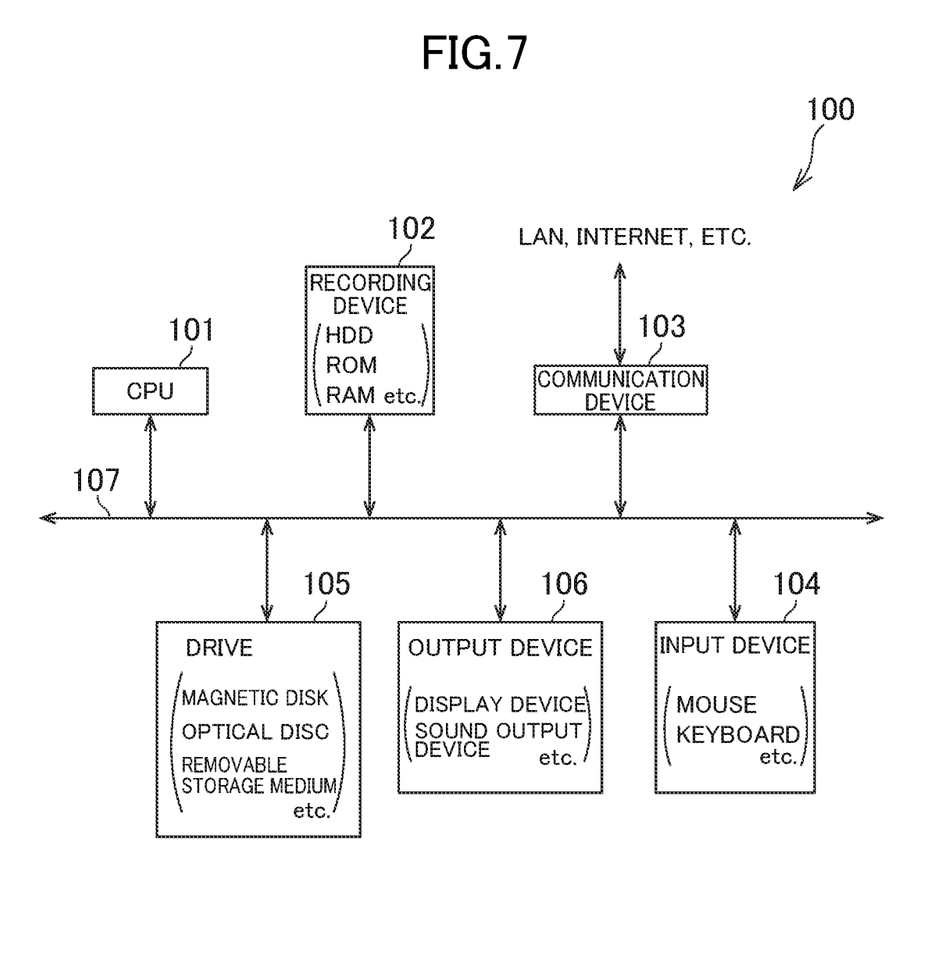
FIG. 7 is a block diagram for illustrating an example of a hardware configuration of a computer configured to execute a series of procedures of processing as the electric motor control apparatus by software.

FIG. 7 is a block diagram for illustrating an example of a hardware configuration of such a computer 100. The computer may include a central processing unit (CPU) 101, a recording device 102 such as a hard disk drive (HDD), a read only memory (ROM), and a random access memory (RAM), a communication device 103 connected to a network such as a local area network (LAN) or the Internet, an input device 104 such as a mouse and a keyboard, a drive 105 configured to read and write a magnetic disk, for example, a flexible disk, various types of optical discs, for example, a compact disc (CD), a magneto-optical (MO) disc, and a digital versatile disc (DVD), a removable storage medium, for example, a semiconductor memory, and an output device 106 such as a display device, for example, a monitor, and a sound output device, for example, a speaker and headphones. Those devices forming the computer 100 may be connected to one another through a data bus 107 to be integrated in a manner that allows communication of information thereamong. Moreover, this computer 100 may include a field programmable gate array (FPGA) or an application specific integrated circuit (ASIC) in addition to or in place of the CPU 101. Moreover, the computer 100 may execute a program recorded in the recording device 102 or the removable medium, or a program obtained through the network, to thereby execute at least a part of the series of procedures of processing.

It should be understood by those skilled in the art that various modifications, combinations, sub-combinations and alterations may occur depending on design requirements and other factors insofar as they are within the scope of the appended claims or the equivalents thereof.

The invention claimed is:

1. An electric motor control apparatus, comprising:
a high-pass filter configured to extract a speed ripple component from a difference between an angular frequency command and an angular frequency feedback;
a phase locked loop circuit configured to generate a phase of the speed ripple component from the speed ripple component which is directly input to the phase locked loop circuit;
a torque compensation value generation circuit configured to multiply a value of a periodic function corresponding to the phase and a given amplitude by each other, to thereby generate a torque compensation value;
a speed controller configured to calculate a torque command value from the difference between the angular frequency command and the angular frequency feedback;
a current controller configured to control a current to be output to an electric motor based on a compensated torque command obtained by adding the torque compensation value to the torque command value; and
wherein the phase locked loop circuit is configured to use d-q conversion so as to generate the phase from the speed ripple component and a component obtained by shifting the phase of the speed ripple component by 90°.

2. The electric motor control apparatus according to claim 1, wherein the phase locked loop circuit is configured to generate the phase based further on a given offset value.

3. The electric motor control apparatus according to claim 1, further comprising an amplitude change circuit configured to change the given amplitude.

4. The electric motor control apparatus according to claim 3, wherein the amplitude change circuit is configured to increase the given amplitude at least after a speed of the electric motor is settled.

5. The electric motor control apparatus according to claim 4, wherein the increase of the given amplitude is gradual.

6. The electric motor control apparatus according to claim 4, wherein the amplitude change circuit is configured to determine the given amplitude in accordance with an amplitude of speed feedback.

7. The electric motor control apparatus according to claim 4, wherein the amplitude change circuit is configured to reduce the given amplitude when a speed of the electric motor changes.

8. The electric motor control apparatus according to claim 7, wherein the reduction of the given amplitude is gradual.

9. A compressor, comprising:
an electric motor control apparatus; and
an electric motor to be controlled by the electric motor control apparatus;
wherein the electric motor control apparatus comprises:
a high-pass filter configured to extract a speed ripple component from a difference between an angular frequency command and an angular frequency feedback;
a phase locked loop circuit configured to generate a phase of the speed ripple component from the speed ripple component which is directly input to the phase locked loop circuit;
a torque compensation value generation circuit configured to multiply a value of a periodic function corresponding to the phase and a given amplitude by each other, to thereby generate a torque compensation value;
a speed controller configured to calculate a torque command value from the difference between the angular frequency command and the angular frequency feedback;
a current controller configured to control a current to be output to the electric motor based on a compensated torque command obtained by adding the torque compensation value to the torque command value; and
wherein the phase locked loop circuit is configured to use d-q conversion so as to generate the phase from the speed ripple component and a component obtained by shifting the phase of the speed ripple component by 90°.

10. An electric motor control method, comprising:
extracting a speed ripple component from a difference between an angular frequency command and an angular frequency feedback;
generating a phase of the speed ripple component from the speed ripple component which is directly input to a phase locked loop circuit which is configured to use d-q conversion so as to generate the phase from the speed ripple component and a component obtained by shifting the phase of the speed ripple component by 90°;
multiplying a value of a periodic function corresponding to the phase and a given amplitude by each other, to thereby generate a torque compensation value;
calculating a torque command value from the difference between the angular frequency command and the angular frequency feedback;
obtaining a compensated torque command by adding the torque compensation value to the torque command value; and
controlling a current to be output to an electric motor based on the compensated torque command.

* * * * *